(12) United States Patent
Kneuper et al.

(10) Patent No.: US 10,227,142 B1
(45) Date of Patent: Mar. 12, 2019

(54) SYSTEMS AND METHODS FOR DETECTING IMPACTS TO VEHICLE SURFACES

(71) Applicant: The Boeing Company, Chicago, IL (US)

(72) Inventors: Nils Kneuper, Bergkamen (DE); Ralf Rene Shu-Zhong Cabos, Braunschweig (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/702,988

(22) Filed: Sep. 13, 2017

(51) Int. Cl.
*B64D 45/00* (2006.01)
*G01L 5/00* (2006.01)

(52) U.S. Cl.
CPC ............ *B64D 45/00* (2013.01); *G01L 5/0052* (2013.01)

(58) Field of Classification Search
CPC .............................. G01L 5/0052; B64D 45/00

USPC .................................................. 340/962–964
See application file for complete search history.

(56) References Cited

U.S. PATENT DOCUMENTS

| | | | |
|---|---|---|---|
| 9,327,842 B2 | 5/2016 | Khial et al. | |
| 9,708,057 B2 * | 7/2017 | Birchette | ................. B64C 25/60 |
| 2009/0183573 A1 * | 7/2009 | Fricke | ................... G01L 9/0051 |
| | | | 73/716 |
| 2013/0340511 A1 * | 12/2013 | Miller | ..................... G01G 19/07 |
| | | | 73/65.05 |
| 2014/0036686 A1 * | 2/2014 | Bommer | ............... H04W 24/06 |
| | | | 370/241 |
| 2017/0257160 A1 * | 9/2017 | Pichavant | .......... H04B 7/18508 |
| 2017/0320532 A1 * | 11/2017 | Salvaggio, Jr. | ........... F21K 9/64 |

\* cited by examiner

*Primary Examiner* — Allen T Cao
(74) *Attorney, Agent, or Firm* — Walters & Wasylyna LLC

(57) ABSTRACT

A vehicle, includes a vehicle and a strain gauge. The vehicle includes a vehicle body component exposed to an exterior of the vehicle. The strain gauge is coupled with the vehicle body component.

20 Claims, 13 Drawing Sheets

SYSTEMS AND METHODS FOR DETECTING IMPACTS TO VEHICLE SURFACES

FIELD

This application relates to systems and methods for detecting impacts to vehicle surfaces and, more particularly, to systems and methods for detecting impacts to aircraft surfaces.

BACKGROUND

Foreign objects commonly impact vehicles while in motion. The problem of impact of foreign objects upon aircraft is particularly significant. Foreign objects impacting aircraft during flight include hail, sleet and birds. Additionally, parts, rocks and gravel on a taxiway or runway may also strike an aircraft while on the ground. The problem of impacts of objects upon aircraft has been a major factor which has been growing in significance, especially with increasing capabilities of unmanned aerial vehicles (UAVs).

When an object impacts upon an aircraft during flight, it may not be noticeable to the flight crew. Even when noticed, the flight crew may not know the location and magnitude of the impact, and the flight crew may not know if the impact resulted in damage, the location of the damage, and the severity of the damage. Conversely, it may sometimes seem to the flight crew that an impact has occurred when in reality no impact occurred. Also, when flying through a storm, it can be difficult to distinguish between soft hail, which may cause no or little damage, and hard hail, which may result in dimples on a leading-edge surface that could affect performance of an aircraft.

When an impact of an object upon an aircraft is suspected by a flight crew, there may be mandatory reporting requirements that require a visual inspection of the aircraft upon landing. False detections of impact by a flight crew may cause significant flight delays. Also, a lack of knowledge of a location of the suspected impact may increase an inspection time due to unnecessary visual examination of portions of the aircraft that were not affected by the impact.

Accordingly, those skilled in the art continue with research and development in field of systems and methods for detecting impacts to vehicle surfaces, and in particular aircraft and systems and methods for detecting impacts to aircraft surfaces.

SUMMARY

In one aspect, a vehicle includes: a vehicle, including a vehicle body component exposed to an exterior of the vehicle; and a strain gauge coupled with the vehicle body component.

In another aspect, a system for detecting impacts to vehicle surfaces includes: a plurality of strain gauges coupled with a vehicle body component exposed to an exterior of the vehicle; a measurement circuit connected to each of the plurality of strain gauges; and a data logger connected to the measurement circuit.

In yet another aspect, a method for detecting impacts to vehicle surfaces includes: measuring an electrical parameter of a strain gauge as a function of time while the vehicle is in motion, wherein the strain gauge is coupled with a vehicle body component exposed to an exterior of the vehicle; and flagging for a potential impact condition when the measured electrical parameter of the strain gauge satisfies a potential impact indicator.

Other aspects of the disclosed systems and methods for detecting impacts to vehicle surfaces, will become apparent from the following detailed description, the accompanying drawings and the appended claims.

DETAILED DESCRIPTION

Figure 1:
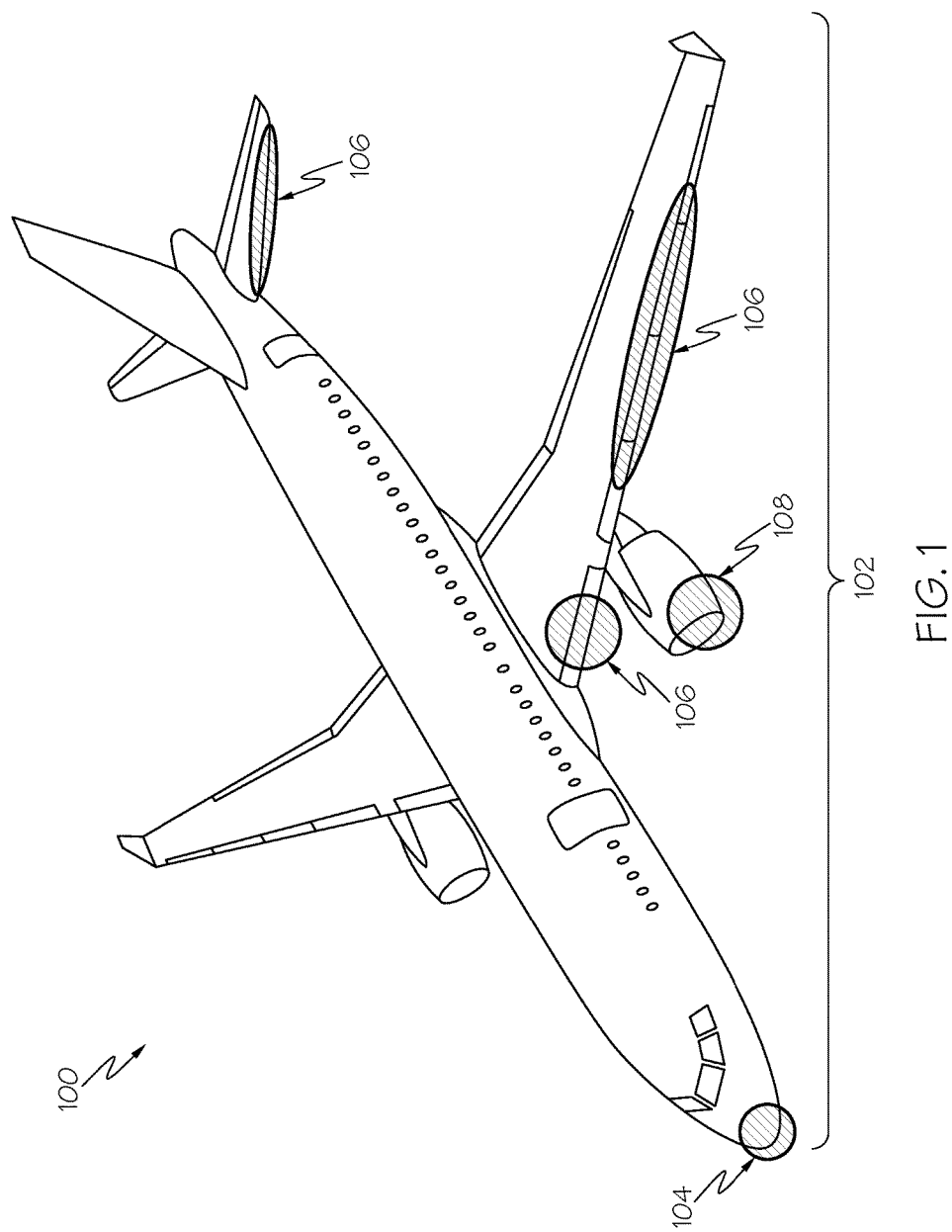
FIG. 1 is a view of an exemplary vehicle according to the present description.

FIG. 1 is a view of an exemplary vehicle according to the present description. FIG. 1 illustrates a vehicle comprising a vehicle, including a vehicle body component exposed to an exterior of the vehicle. Although the vehicle is described with reference to an aircraft, the vehicle may include a space, air, land or water vehicle. As illustrated in FIG. 1, an aircraft comprises an aircraft/vehicle 100, including an aircraft body component 102 exposed to an exterior of the aircraft. The aircraft body component 102 may include any component of the aircraft that is exposed to an exterior of the aircraft. In one aspect, the at least one aircraft body component may include at least one component of an aircraft fuselage, wing, tail, landing gear, stabilizer, or engine. In another aspect, the aircraft body component 102 may include, for example, a forward-facing component of the aircraft, which may have an increased occurrence of impact. In another aspect, the aircraft body component 102 may include, for example, one of a nose 104, a leading-edge surface such as a leading-edge slat 106, and a nacelle 108 of the aircraft 100. However, the aircraft body component 102 is not limited to a component of an aircraft fuselage, wing, tail, landing gear, stabilizer, or engine, and a forward-facing component of the aircraft and is not limited to a nose, a leading-edge surface, and a nacelle of the aircraft.

A strain gauge may be coupled with a vehicle body component, such as aircraft body component 102, that is exposed to an exterior of the vehicle. The aircraft body component 102 having a strain gauge coupled therewith may be a component that is particularly susceptible to potential impact from an external object during a flight of the aircraft. The at least one aircraft body component 102 may include at least one component of an aircraft's fuselage, wings, stabilizers, or engine. The aircraft body component 102 may include a component that is a forward-facing during a flight of the aircraft. The aircraft body component 102 may be, for example, one of a nose 104, a leading-edge slat 106, and a nacelle 108 of the aircraft as illustrated in FIG. 1.

Coupling the strain gauge with the vehicle body component, e.g. aircraft body component, enables a detection of impacts and may additionally enable a determination of a location of the impact, a magnitude of the impact, whether the impact resulted in damage, a location of the damage, and a severity of the damage. If an object impacts with a surface of the vehicle body component having a strain gauge coupled therewith, the strain gauge enables the detection of a strain applied to the vehicle body component as a result of the impact due to a change in an electrical characteristic of the strain gauge. The strain gauge may include any strain gauge capable of detecting a strain of a vehicle body component. For example, the strain gauge may include a metal foil strain gauge, a metal wire strain gauge, a thin metal film strain gauge, a diffused metal strain gauge, a semiconductor strain gauge, or a microelectromechanical system (MEMS) strain gauge, and any equivalents. The strain gauge may detect a strain of the vehicle body component by the strain gauge itself being strained along with the vehicle body component and by the strain gauge changing an electrical characteristic, e.g. resistance, of the strain gauge in response to the strain.

In an additional aspect, the strain gauge may measure a strain applied to a vehicle body component as a result of an impact. For example, an amount of strain applied to the vehicle body component may correlate to an amount of strain applied to the strain gauge, and the amount of strain applied to the strain gauge may correlate to a change in an electrical characteristic of the strain gauge, such that the change in the electrical characteristic of the strain gauge may be measured to determine an amount of strain applied to the vehicle body component.

Figure 2A:
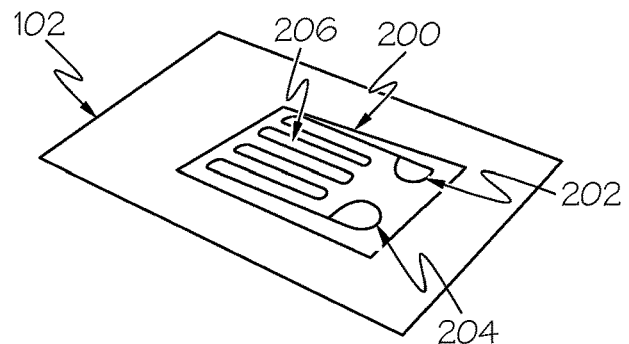
FIGS. 2A, 2B and 2C are views of an exemplary strain gauge coupled with a vehicle body component according to the present description.
Figure 2B:
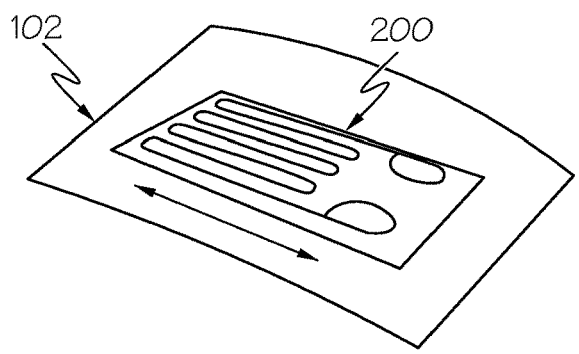
Figure 2C:
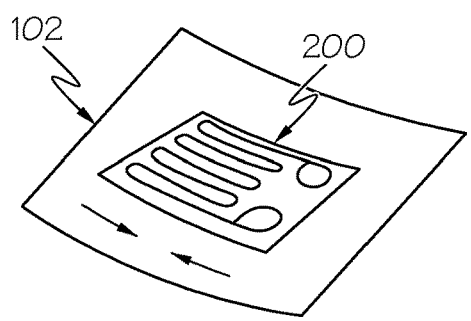

FIGS. 2A, 2B and 2C illustrate an exemplary strain gauge 200 coupled with a vehicle body component, e.g. aircraft body component 102. As illustrated in FIG. 2A, the strain gauge 200 may include a first terminal 202, a second terminal 204, and a strain-sensitive conductive circuit pattern 206 electrically connected between the first terminal 202 and the second terminal 204. The strain gauge 200 may include, for example, an electrical circuit formed on a thin plastic film that is affixed (e.g. glued) to a surface of the aircraft body component 102. As a result, the strain gauge may capture the same or approximately the same movement as the aircraft body component 102 to which it is affixed, and a resistance of the circuit of the strain gauge may change in response to the movement of the strain gauge.

FIGS. 2B and 2C illustrate the strain gauge 200 when the aircraft body component 102 is being subject to tension and compression, respectively. When the aircraft body component and strain gauge are subject to tension, a resistance of the circuit of the strain gauge increases. When the aircraft body component and strain gauge are subject to compression, a resistance of the circuit of the strain gauge decreases. Thereby, a causality chain is provided between a strain of the aircraft body component 102 and an electrical resistance of the strain gauge, which may then be detected or measured as a voltage. This voltage may be detected or measured intermittently or constantly.

Figure 3A:
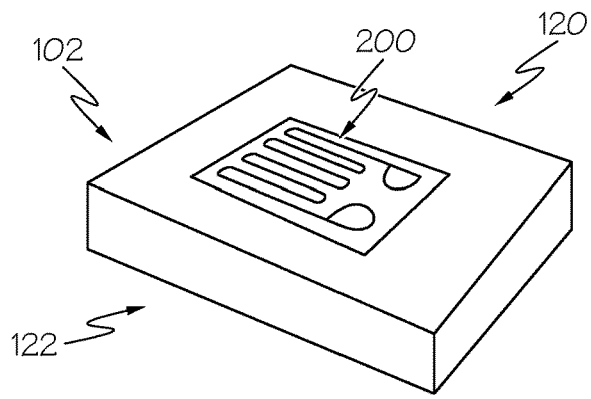
FIGS. 3A, 3B and 3C are illustrations of exemplary couplings of a strain gauge with a vehicle body component according to the present description.
Figure 3B:
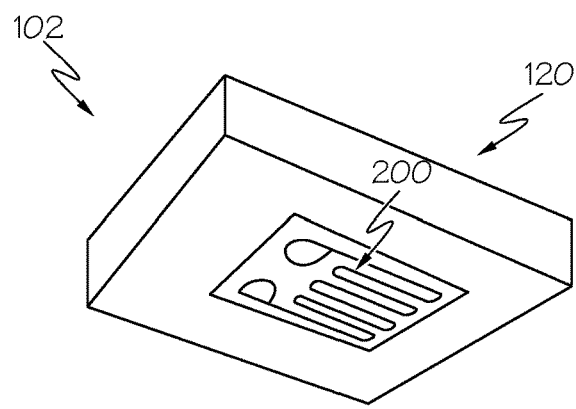
Figure 3C:
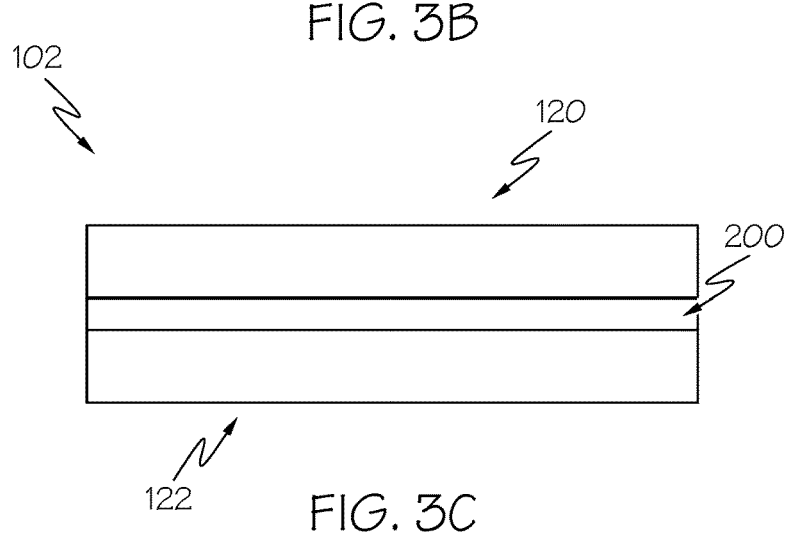

The strain gauge may be coupled with the vehicle body component in any manner that permits the strain gauge to detect a change in strain of the vehicle body component, and preferably to measure a change in strain of the vehicle body component. FIGS. 3A, 3B and 3C illustrate exemplary couplings of a strain gauge with a vehicle body component. In particular, FIGS. 3A, 3B and 3C illustrate portions of a vehicle body component, such as an aircraft body component 102, having a strain gauge 200 coupled therewith. As illustrated in FIG. 3A, the aircraft body component 102 may include a first surface 120 and a second surface 122 opposite the first surface 120, and the strain gauge 200 may be affixed to the first surface 120. Alternatively, as illustrated in FIG. 3b, the strain gauge 200 may be affixed to the second surface 122, or, as illustrated in the section view of FIG. 3C, the strain gauge 200 may be positioned within the aircraft body component 102 between the first surface 120 and second surface 122. Affixing the strain gauge 200 to the first surface 120 or second surface 122 rather than positioning the strain gauge 200 within the aircraft body component 102 may more easily permit retrofitting a strain gauge to an existing aircraft and may permit advantageous use of commercially available strain gauges.

In one aspect, the first surface 120 may be a forward-facing surface and the second surface 122 may be a rearward-facing surface, and the strain gauge 200 may be affixed to the second surface 122. Affixing the strain gauge 200 opposite to the forward-facing surface may protect the strain gauge 200 from damage due to weather or impacts from objects. For example, when the aircraft body component 102 is a leading-edge slat 106, the first surface 120 may be a forward-facing exterior surface of the leading-edge slat 106, and the second surface 122 may be a rearward-facing exterior surface of the leading-edge slat 106, and the strain gauge 200 may be affixed to the second surface 122.

In another aspect, the first surface 120 may be an exterior surface and the second surface 122 may be an interior surface, and the strain gauge 200 may be affixed to the second surface 122. Affixing the strain gauge 200 to an interior surface may protect the strain gauge 200 from damage due to weather or impacts from objects. For example, when the aircraft body component 102 is a nose 104, the first surface 120 may be a forward-facing exterior surface of the nose 104, and the second surface 122 may be a rearward-facing interior surface of the nose 104.

In yet another aspect, the first surface 120 may be a surface of the aircraft body component 102 that is more susceptible to normal flight-related strain, and the second surface 122 may be a surface of the aircraft body component 102 that is less susceptible to normal flight-related strain, wherein the strain gauge 200 is affixed to the second surface 122. Normal flight-related strain includes the strain due to aerodynamic forces that may inevitable occur to an aircraft body component 102 during takeoff, while in-flight, and during landing. Affixing the strain gauge 200 to the surface that is less susceptible to normal flight related strain may minimize the detecting and measuring of normal flight-related strain by the strain gauge 200.

In yet another aspect, the aircraft may include a plurality of strain gauges 200 coupled with a plurality of aircraft body components 102. The plurality of strain gauges 200 may be coupled in any manner as described above. Coupling of a plurality of strain gauges 200 with a plurality of aircraft body components 102 enables the detection and measurement of strain at the aircraft body components 102. By way of example, one strain gauge may be coupled with a nose 104, another strain gauge may be coupled with a leading-edge slat 106, and yet another strain gauge may be coupled with a nacelle 108 of the aircraft. The desired number of strain gauges for a particular application may be determined based on the spatial resolution desired and the sensitivity of the selected strain gauges (sensors) coupled with the detection system among other factors.

In yet another aspect, the aircraft may include a plurality of strain gauges 200 coupled with a plurality of portions of a single aircraft body component. The strain gauges 200 may be coupled in any manner as described above. Coupling of plurality of strain gauges 200 with a plurality of portions of an aircraft body component 102 enables the detection and measurement of strain at different portions of the aircraft body component 102.

Figure 4:
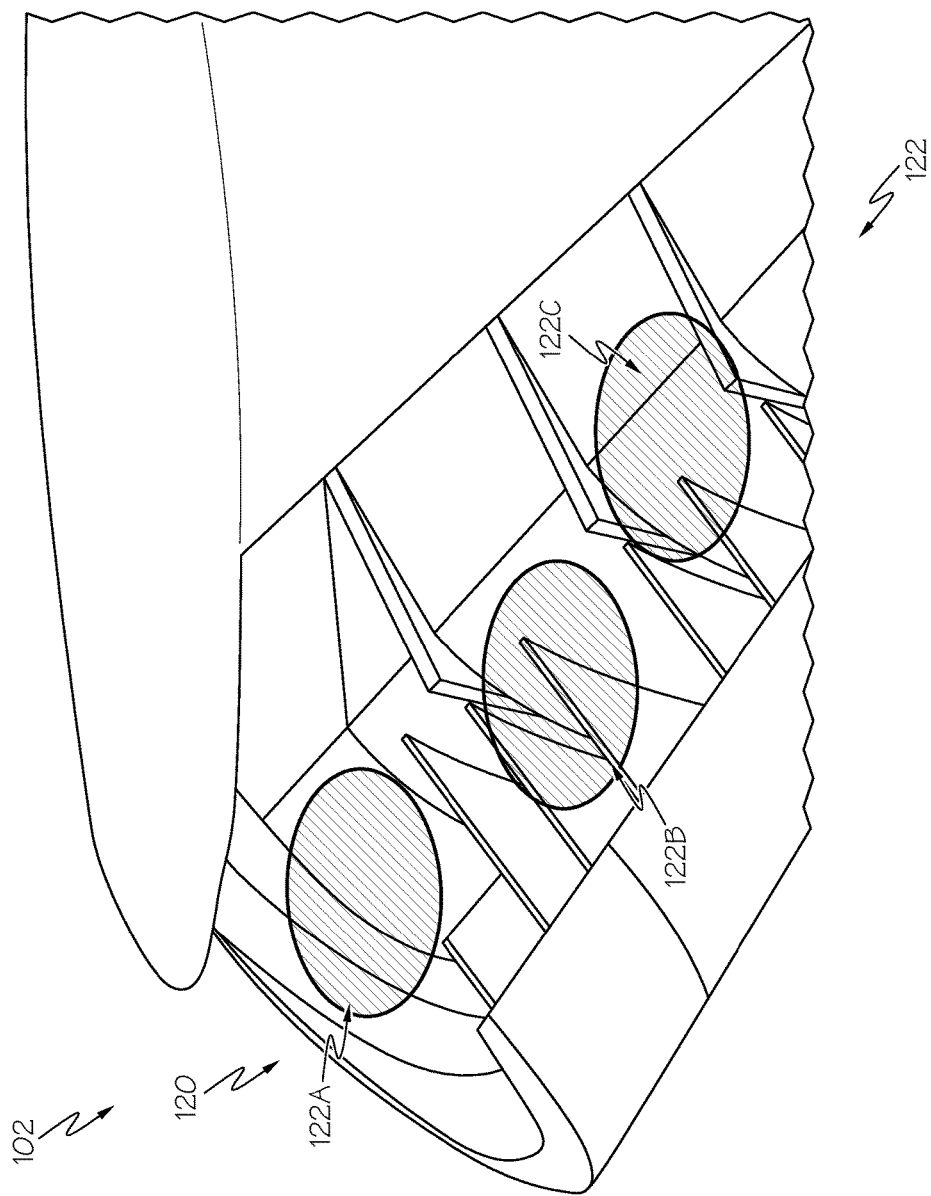
FIG. 4 is an illustration of an application of strain gauges on inward facing sides of a leading-edge slat according to the present description.

In an example, FIG. 4 illustrates an application of strain gauges on inward facing sides of a leading-edge slat 106, which includes a first surface 120 as a forward-facing surface and a second surface 122 as a rearward-facing surface. The second surface 122 has a plurality of portions 122A, 122B, and 122C. A first strain gauge may be affixed to portion 122A, a second strain gauge may be affixed to portion 122B, and a third strain gauge may be affixed to portion 122C. Thereby, a change in electrical characteristic, e.g. resistance, of the first, second, and third strain gauges may be detected to determine a location of an impact. Additionally, the change in electrical characteristic, e.g. resistance, of the first, second, and third strain gauges may be measured to determine a magnitude of impact at each location and the presence, location and severity of damage at each location.

Strain gauges are particularly suitable to be employed with aircraft according to the present description. Strain gauges can be made to have a very low weight, and strain gauges may be designed to be flexibly applied to any surface. In an aspect, a strain gauge may include a flexible plastic film, and the film may be insulated against weather. In an aspect, the strain gauges may inhibit the following disturbance values:

With regards to temperature, while a correlation between electrical resistance and temperature may exist, strain gauges could be calibrated by testing a change in nominal resistance values relative to a change in temperature during an exemplary flight. Also, correlation between temperature and resistance values of a strain gauge may only be critical in high-temperature surroundings in excess of hundreds of degrees Celsius. If desirable, a difference measuring circuit such as a Wheatstone bridge could be employed to correct for a voltage deviation generated by changes in temperature.

With regards to creep of the strain gauges, while strain gauges under tension will exhibit creep over time, creep is a process that happens over a great length of time at the relevant temperatures of application of the strain gauge. Since the strain gauges are coupled to an aircraft body component to identify major jumps in resistance, creep may not detrimentally affect the detection and measurement of strain of aircraft body components at the relevant temperatures.

With regards to other properties of strain gauges, such as hysteresis, static pressure, radiation, electromagnetic and electric fields, strain gauges may be made to exhibit no provable hysteresis and may be made to be unsusceptible to static pressure. Aircraft landing at airports located at different altitudes therefore may detrimentally affect the detection and measurement of strain of aircraft body components.

Strain gauges may be susceptible to nuclear radiation. Nonetheless, strain gauges have been successfully employed in space. With the possible exception of nuclear disaster-relief aircraft, the strain gauges may be deployed without being hindered by nuclear radiation. Only excessively strong electromagnetic fields (superconductors) generate disturbances in a strain gauge's signal, which are not necessarily present in an aircraft. Furthermore, strain gauges can be shielded from electric fields to eliminate effects on the strain gauge. Additionally, by applying the gauges on the inside of aircraft parts, they might even be shielded from electric fields, due to them being effectively in a Faraday's cage (in the case of an aluminum part).

Figure 5:
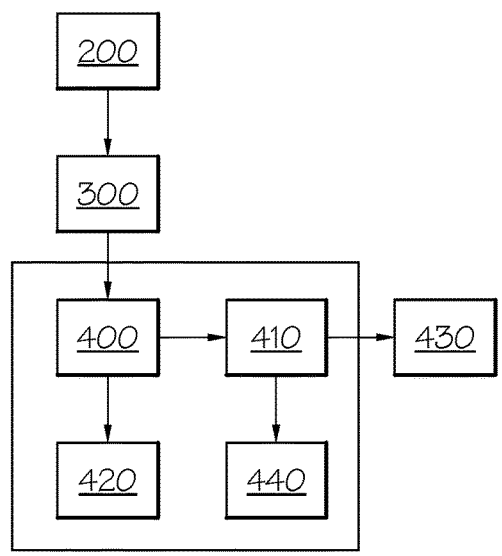
FIG. 5 is an illustration of a system for detecting impacts to vehicle surfaces according to the present description.

FIG. 5 illustrates a system for detecting impacts to vehicle surfaces, in particular aircraft surfaces. The system includes one or more strain gauges 200 coupled with one or more aircraft body components exposed to an exterior of the aircraft, a measurement circuit 300 connected to the strain gauge 200, and a data logger 400 connected to the measurement circuit 300. The system may further include a processor 410, a communication device 420, an output device 430, and a storage device 440. As illustrated, in a non-limiting example, the data logger 400, processor 410, communication device 420, and storage device 440 may be in the form of a central on-board computer.

Figure 6:
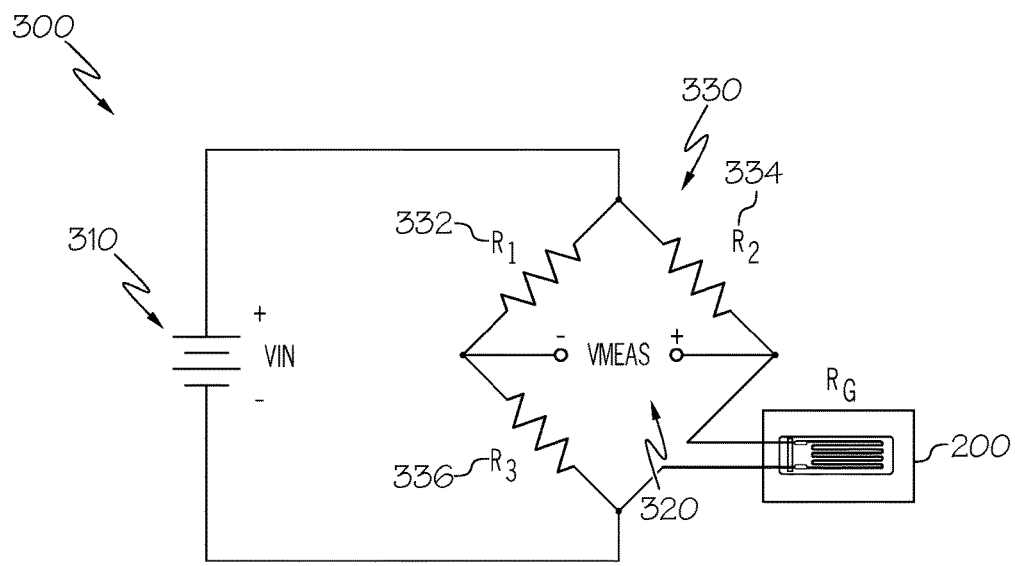
FIG. 6 is an illustration of an exemplary measurement circuit according to the present description.

An exemplary measurement circuit 300 connected to a strain gauge 200 is illustrated in FIG. 6. In the illustrated example, the measurement circuit 300 may include, for example, a voltage source 310 having a first terminal and a second terminal, a voltage sensor 320 having a first terminal and a second terminal, and a network of resistors 330 arranged as a Wheatstone Bridge. In the illustrated example, the network of resistors 330 includes a first resistor 332 having a fixed and known resistance value connected between the first terminal of the voltage source 310 and the first terminal of the voltage sensor 320. The network of resistors 330 further includes a second resistor 334 having a fixed and known resistance value connected between the first terminal of the voltage source 310 and the second terminal of the voltage sensor 320. The network of resistors 330 further includes third resistor 336 having a fixed and known resistance value connected between the second terminal of the voltage source 310 and the first terminal of the voltage sensor 320. The network of resistors 330 further includes the strain gauge 200 having a variable and unknown resistance value connected between the second terminal of the voltage source 310 and the second terminal of the voltage sensor 320. Accordingly, a resistance of the strain gauge may be measured by comparing a voltage applied by the voltage source 310 to the voltage detected by the voltage sensor 320. By measuring a resistance of the strain gauge, which correlates to a strain of the aircraft body component 102 to which the strain gauge is coupled, a change in strain of the aircraft body component 102 may be measured. Although the measurement circuit of FIG. 6 is illustrated as a Wheatstone bridge for outputting a voltage corresponding to an unknown voltage, the measurement circuit may include any other circuit for determining a strain-sensitive electrical characteristic of the strain gauge.

The data logger 400 may include any electronic device that records data over time from one or more connected strain gauges. The data logger 400 may be a single electrical device connected to one or more strain gauges, or the data logger 400 may be a combination of electrical devices, such as first electrical device connected with a first strain gauge, a second electrical device connected with a second strain gauge, etc. The data logger 400 may be an independent electrical device or part of a central on-board computer to which one or more strain gauges are connected.

The system for detecting impacts to flight surfaces may further include a processor 410 connected to the data logger. The processor 410 may include any electronic device that processes data recorded by the data logger. The processor 410 may be a single electrical device connected to one or more data loggers 400, or the processor 410 may be a combination of electrical devices, such as first processor connected with a first data logger, a second processor connected with a second data logger, etc. The processor 410 may be an independent electrical device or part of a central on-board computer that includes the data logger 400. Together, the data logger 400 and processor 410 are able to process data, perform evaluations and flag for a potential impact condition when a measured electrical parameter of the one or more strain gauges satisfies a potential impact indicator. As used herein, the term flag or flagging refers to various methods of detecting, capturing, or recording an event for later review. A flag may also be implemented in various ways such as a bit set in a register of a computer or a memory location, a latch condition for a transient, etc.

The system for detecting impacts to flight surfaces may further include a communication device 420 connected to the processor. The communication device 420 may include any electronic device that communicates data recorded by the data logger or communicates data received from the processor. The communication device 420 may be a single electrical device or may be a combination of electrical devices. The communication device 420 may be an independent electrical device or part of a central on-board computer that includes the data logger and processor. The communication device 420 is able to relay data to the ground or to the flight deck. The communication device 420 may include a wireless data link or may include an Aircraft Communications Addressing and Reporting System (ACARS).

The system for detecting impacts to flight surfaces may further include an output device 430 connected to the communication device. The output device 430 may include any electronic device that outputs data recorded by the data logger, processed by the processor, or communicated by the communication device. The output device 430 may be a single electrical device or may be a combination of electrical devices. The output device 430 may be an independent electrical device or part of a central on-board computer. The output device 430 may an electrical device located in the flight deck. The output device 430 may notify the pilot of a potential impact condition when the processor flags for the potential impact conduction when a measured electrical parameter of the one or more strain gauges satisfies a potential impact indicator.

The system for detecting impacts to flight surfaces may further include a storage device 440. The storage device 440 may store data recorded by the data logger or data processed by the processor. For example, the processor may flag for a potential impact conduction when a measured electrical parameter of the one or more strain gauges satisfies a potential impact indicator, and the storage device 440 may store information associate with the flag for a potential impact condition. Furthermore, a damage report may be transferred to the storage device 440. The storage device 440 may be accessible to mechanics or the pilot to help identify whether the nature of an impact. The storage device 440 may include an on-board storage or may include a remote storage not co-located with the aircraft. Storage of date may service as training data for machine learning algorithms. In this way, it might be possible to have machine learning algorithms predict further information based on the data available when an object impacts an aircraft.

Figure 7:
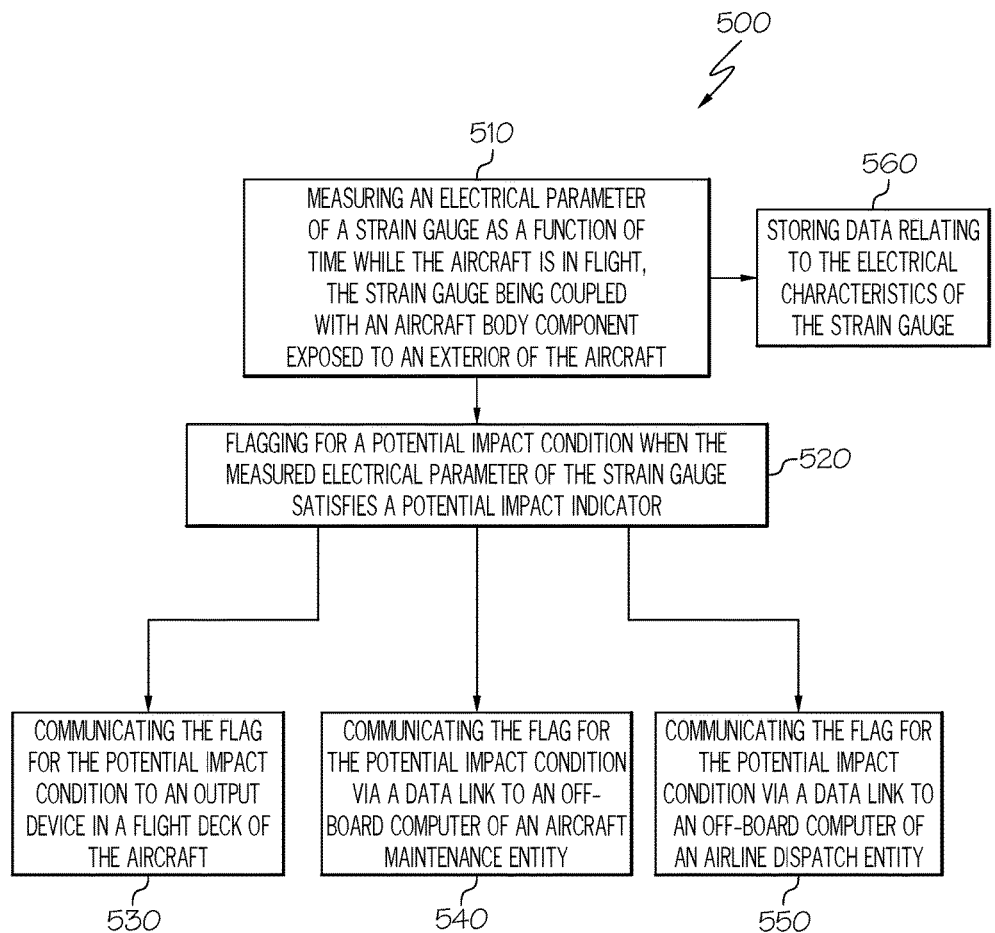
FIG. 7 is an illustration of a method for detecting impacts to an aircraft according to the present description.

FIG. 7 illustrates a method 500 for detecting impacts to an aircraft. The method 500 includes, at block 510, measuring an electrical parameter of a strain gauge as a function of time while the aircraft is in flight, the strain gauge being coupled with an aircraft body component exposed to an exterior of the aircraft, and, at block 520, flagging for a potential impact condition when the measured electrical parameter of the strain gauge satisfies a potential impact indicator. The method 500 may further include, at block 530, communicating the flag for the potential impact condition to an output device in a flight deck of the aircraft. By doing so, the pilot's awareness of the situation of the aircraft can be improved regarding whether an impact occurred, the magnitude of the impact, and the presence, severity, and location of damage. The method 500 may further include, at block 540, communicating the flag for the potential impact condition via a data link to an off-board computer of an aircraft maintenance entity e.g. Airplane Health Management (AHM). By doing so, the aircraft maintenance entity will know early how severe is the damage to the aircraft body component, potentially leading to increased flexibility in arranging for repair operations. The method 500 may further include, at block 550, communicating the flag for the potential impact condition via a data link to an off-board computer of an airline dispatch entity. By doing so, the airline dispatch entity may mitigate will know early about potential flight delays and may mitigate for passenger flight delays while the aircraft is still in flight. The method 500 may further include, at block 560, storing data relating to the electrical characteristics of the strain gauge. By storing data relating to impact events, the impact data may be used to train Machine Learning algorithms. These algorithms may be incorporated into the processor, so when a new collision occurs, the nature of the object (e.g. bird, drone, gravel etc.) can be predicted along with presence, severity, and location of potential damage.

Figure 8:
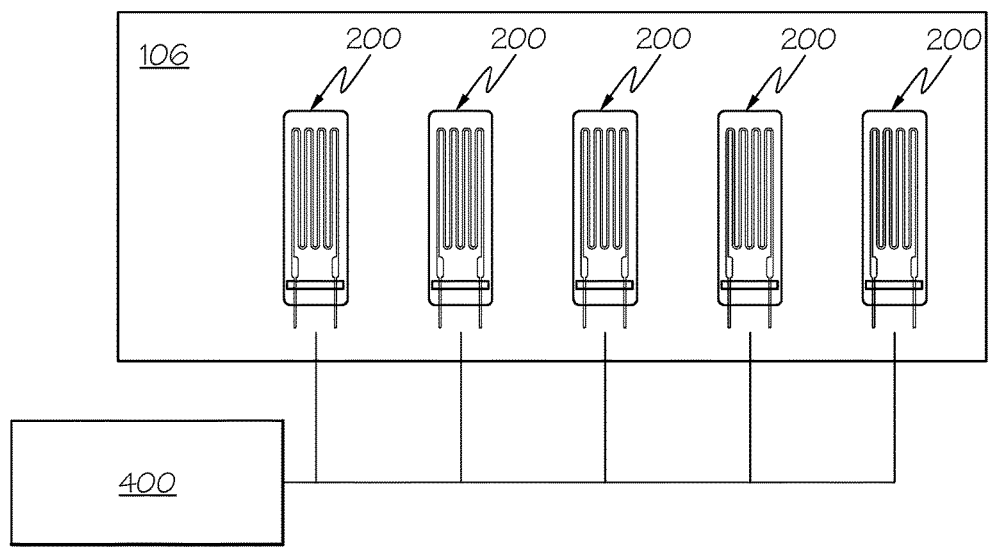
FIG. 8 is an illustration an exemplary application of the system and method of the present description.

FIGS. 8-16 illustrate exemplary applications of the system and method of the present description. As illustrated in FIG. 8, a plurality of strain gauges 200 are applied to a surface, e.g. an inward surface, of a leading-edge slat 106. A measurement circuit (not shown) may include one measurement circuit connected to the plurality of strain gauges or one measurement circuit connected to each strain gauge. The strain gauges 200 are all connected to a data logger 400 and may be further connected to a processor, communication device, output device, and storage device. Accordingly, the system may be able to process data, perform evaluations and publish damage verdicts to both the flight deck and an Airplane Health Management.

Figure 9:
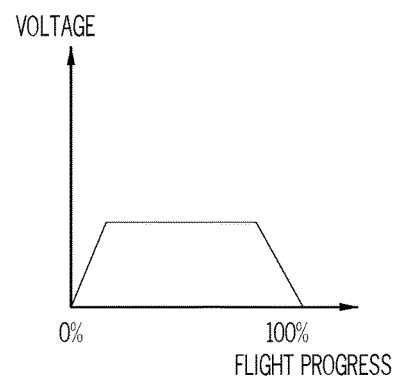
FIG. 9 is an illustration an exemplary application of the system and method of the present description.

FIG. 9 shows an exemplary graph displaying an expected behavior of a gauge's voltage during the normal course of a flight, assuming no impacts with foreign objects. During the course of a flight, from take-off to cruise to landing, a normal voltage reading for these strain gauges may be determined. It is expected that, due to an increase in aerodynamic forces acting on the slat during acceleration at take-off to constant pressure to cruise flight (at a possible ~Mach 0.83), the slat will deform slightly. Due to this deformation, it is expected that the strain gauges will report a change in voltage. This voltage is expected to revert back to its voltage level after the aircraft has landed, as to the point prior to take-off. These changes in voltage may not exactly resemble the voltage graph illustrated in FIG. 9. However, a "normal" (collision-free) voltage graph for strain gauges can be determined in trials. Any flight between any city pair may be used to determine this "normal" or "nominal" strain gauge behavior throughout a flight. This nominal behavior of the strain gauges may be referenced when an impact event occurs.

Figure 10:
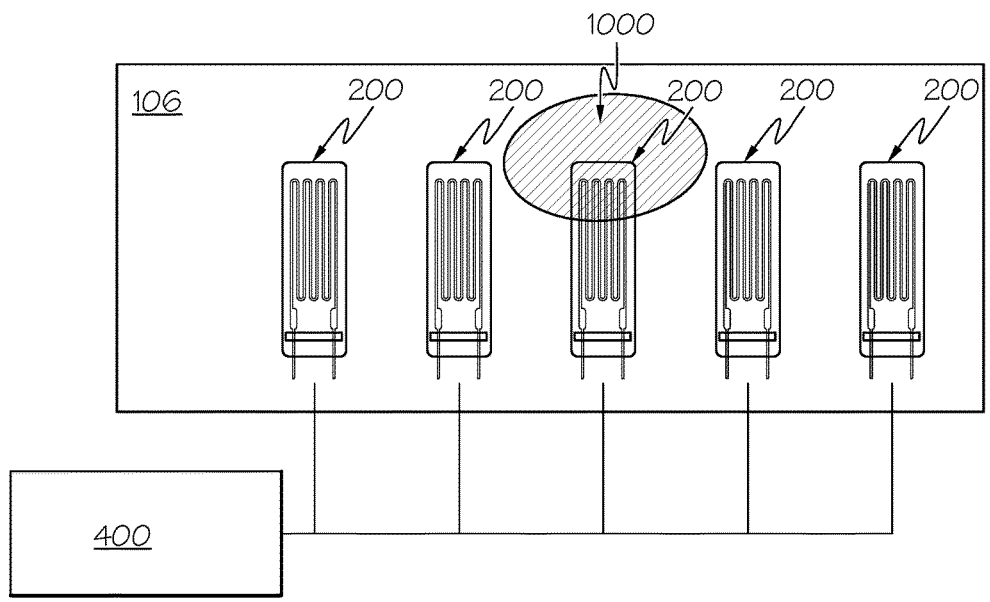
FIG. 10 is an illustration an exemplary application of the system and method of the present description.
Figure 11:
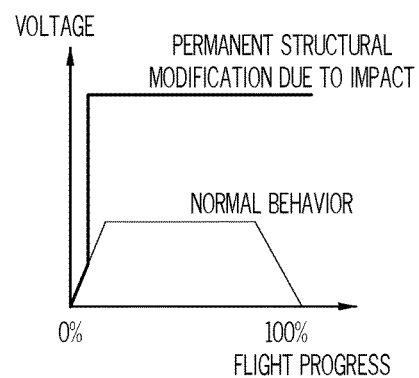
FIG. 11 is an illustration an exemplary application of the system and method of the present description.

FIG. 10 shows the exemplary application of the system and method when an object impacts an outside of the slat 106, indicated by the circled region 1000, leaving permanent structural modifications (e.g. deformations) due to an impact. As the slat 106 will be deformed, the strain gauge 200 will also deform in a corresponding way, altering the strain gauge's voltage output. This output is illustrated by the graph in FIG. 11 on the right side of the figure. At some point during the flight, the object impacts with the slat, resulting in a step in the voltage measured by the strain gauge. If the deformation is permanent, this voltage level will be constant for the remaining of the flight. The measured difference between the nominal behavior pattern of the strain gauge and the behavior of the strain gauge in case of an impact serves as an indicator for the process to flag for the presence of an impact. A second indicator may be the step change in voltage. As the impact will be very sudden, the deformation and hence resistance/voltage will change in the brief period of time, e.g. fraction of a second. This behavior may not be observed during normal flight operations. Therefore, the processor can also employ this second indicator as a reliable flag that an impact has occurred.

Figure 12:
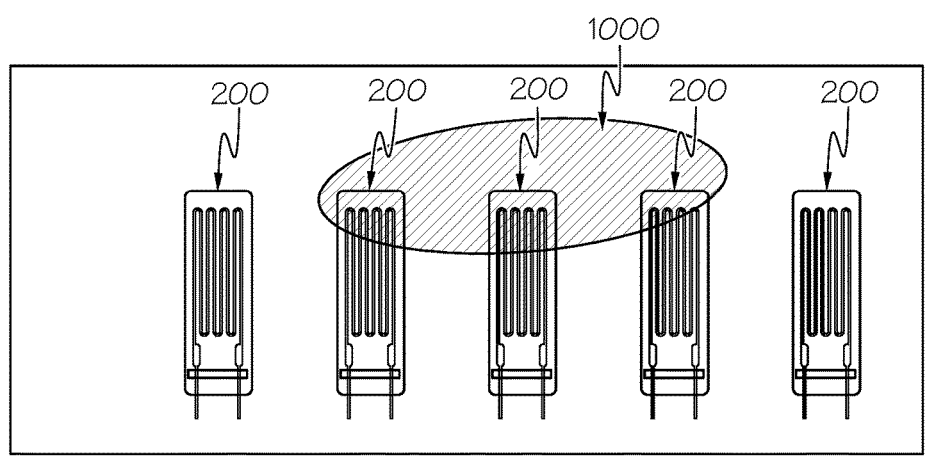
FIG. 12 is an illustration an exemplary application of the system and method of the present description.
Figure 13A:
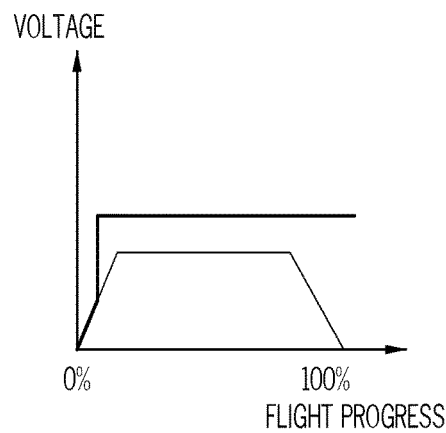
FIGS. 13A, 13B and 13C are illustrations of an exemplary application of the system and method of the present description.
Figure 13B:
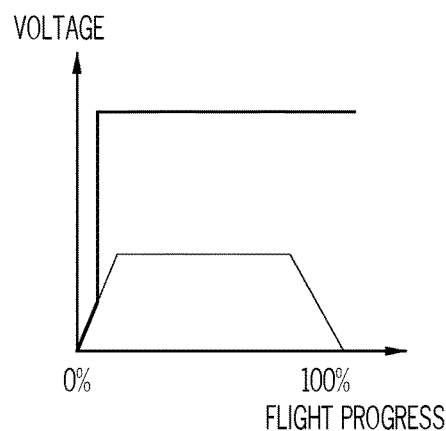
Figure 13C:
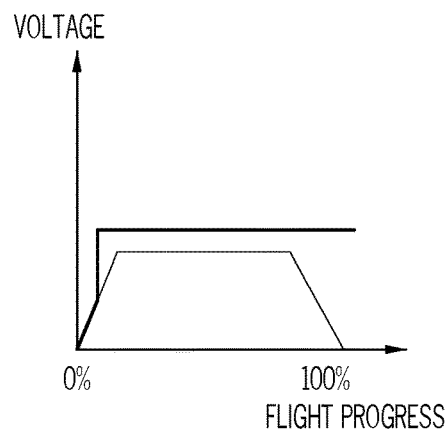

FIGS. 12 and 13 show the system and method of the present description handling data to determine a severity of damage caused by a collision. As illustrated in FIG. 12, an occurring impact region 1000 covers a larger area, i.e. affecting an area covered by three strain gauges. Shown at in FIGS. 13A, 13B and 13C are three exemplary graphs showing the voltage levels for each affected strain gauge. Assuming that the center area absorbs most of the energy of the impact, the deformation will be larger than those of the neighboring area (and strain gauges). Therefore, with higher deformation, the center gauge will report a significantly different voltage level than those of the neighboring two. The system and method of the present description are able to capture the differences between the voltage levels of strain gauges and thus determine where the center point of collision is and which areas of the aircraft part are affected.

Figure 14:
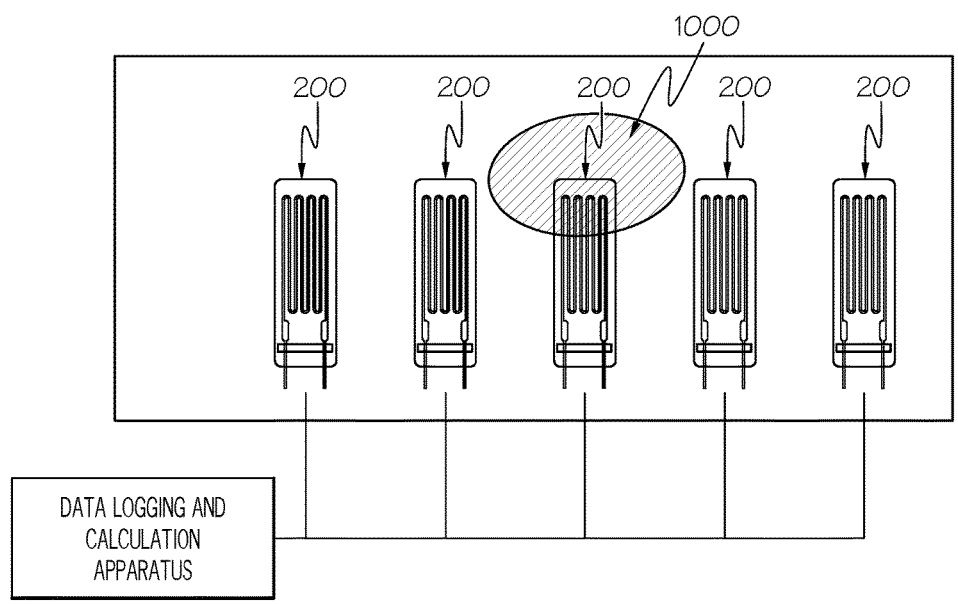
FIG. 14 is an illustration an exemplary application of the system and method of the present description.
Figure 15:
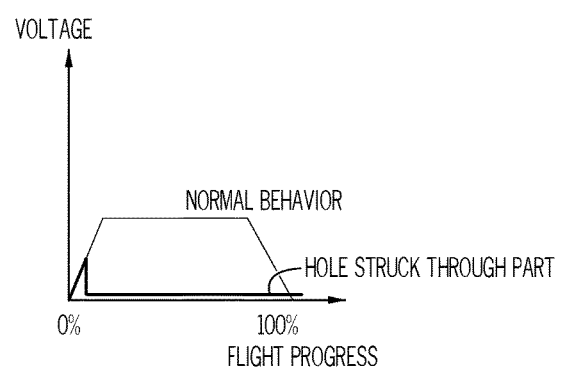
FIG. 15 is an illustration an exemplary application of the system and method of the present description.

FIGS. 14 and 15 show the system and method of the present description for a case that an object penetrates a region 1000 of an aircraft body component. For example, a hole could be struck through the aircraft body component (e.g. aircraft part). Should this happen, the strain gauge may also be structurally destroyed, thereby cutting or opening the electric circuit. This behavior, as illustrated in FIG. 15, can also be used as an indicator for flagging an impact condition and severity of damage. Other open circuit behavior (e.g. stuck high or stuck low) may occur depending on the particular sensing circuitry operably connected to the damaged strain gauge.

Figure 16:
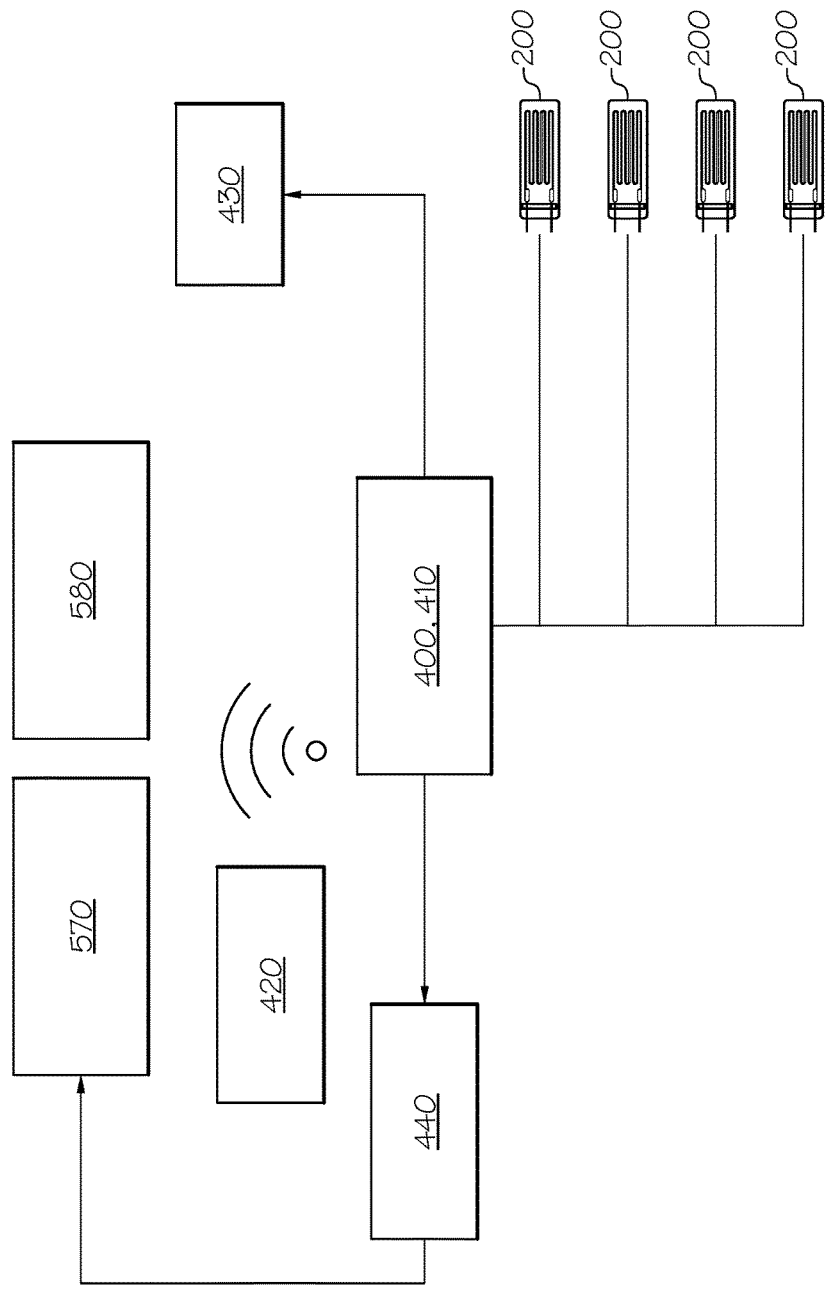
FIG. 16 is an illustration an exemplary application of the system and method of the present description.

FIG. 16 shows an exemplary architecture diagram of a system. Connected to the system are strain gauges 200 at the aircraft body components, such as slats, aircraft nose cone, etc. The data logger 400 and processor 410 are at the center and collect data from strain gauges 200, and this data gets processed and saved in storage device 440. After a flight, the data in this data storage may be downloaded while the aircraft is on the ground during turnaround, or the data may be transferred via a communication device, e.g. data link or ACARS, to an entity that processes this maintenance-related data. If an impact event is detected, the flagging of the impact condition, a notification of the location of impact, and the severity of damage may be relayed to the output device 430 at the flight deck to the pilot and may be sent via communication device 420 (e.g. wireless data link or ACARS) to an aircraft health maintenance entity 540 and/or to an airline dispatch entity 550.

An exemplary process flow in the case of an impact is explained as follows. This process may start, with a foreign object colliding with an aircraft surface. The strain gauges, due to the physical deformation of the part, report a different voltage. This could be a single strain gauge or multiple strain gauges. These strain gauges may jump or change in voltage, which may be captured by the measurement circuit, data logger, and processor.

The voltage signals may be processed in a number of ways. First, the specific strain gauge(s) reporting signal jumps may be used to determine the location along the surface of the aircraft affected. Second, the number of gauges reporting signal jumps may serves as an indicator for how severe the damage is, i.e. the detected severity of damage. Third, the amplitudes of jumps in voltage may be used to determine the magnitude of impact or severity of damage to the aircraft part.

An exemplary result may therefore be made, such as the following exemplary information or damage report: "On some part X, in the vicinity of gauges Y_1 . . . Y_5, a collision with a foreign object occurred. Maximum damage was recorded at gauge Y_3, with gauges Y_1 and Y_5 recording minor damage, gauges Y_2 and Y_4 recording major damage. Foreign object did not penetrate part, but only caused deformations."

This information or damage report may be relayed to the ground via data link and to the flight deck. The former may be for improved planning (by receiving this damage information as early as possible) and the latter may be to inform the pilot of a collision, thereby improving the pilot's situational awareness. Furthermore, this damage report may be saved to be transferred to data storage. After landing, mechanics or the pilot may identify whether the collision was with a bird, UAV, or other object. The damage event, together with this information of what object the collision happened with, may be stored in data storage at AHM or with other maintenance data. With a large number of impact occurrences, Machine Learning algorithms may be applied on this data. These algorithms may then be incorporated into the processor on board the airplane. By doing so, these algorithms can be employed in following collisions, to predict the object type the aircraft collided with. The above described information or damage report may then be extended by the phrase: " . . . The collision object is predicted to be a UAV with an estimated weight of X."

Figure 17:
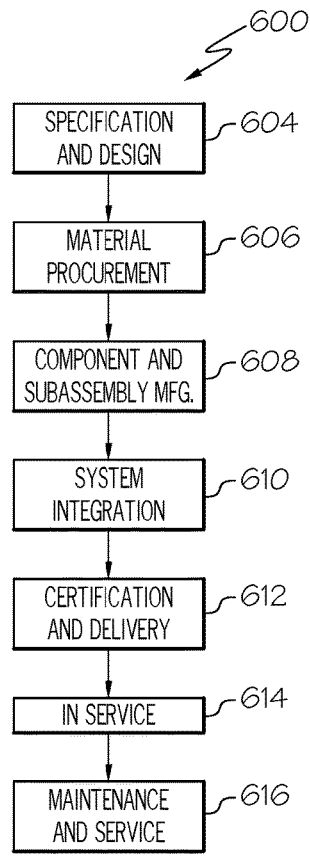
FIG. 17 is flow diagram of an aircraft manufacturing and service methodology according to the present description.
Figure 18:
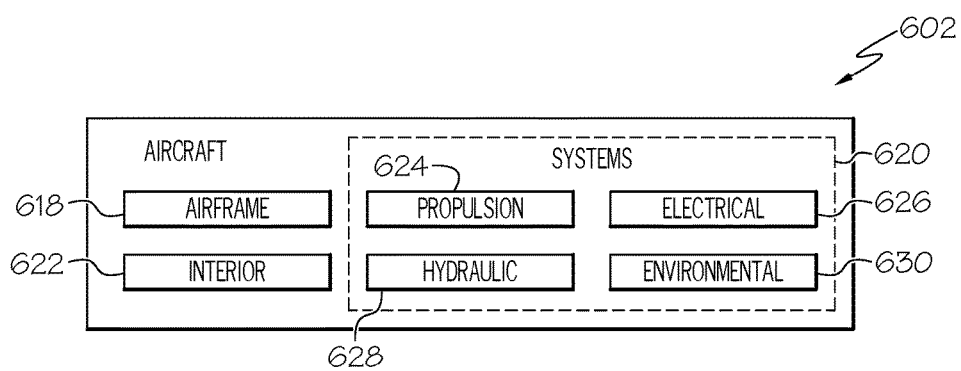
FIG. 18 is a block diagram of an aircraft according to the present description.

Examples of the disclosure may be described in the context of an aircraft manufacturing and service method 600, as shown in FIG. 17, and an aircraft 602, as shown in FIG. 18. During pre-production, the aircraft manufacturing and service method 600 may include specification and design 604 of the aircraft 602 and material procurement 606.

During production, component/subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616, which may also include modification, reconfiguration, refurbishment and the like.

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 602 produced by example method 600 may include an airframe 618 with a plurality of systems 620 and an interior 622. Examples of the plurality of systems 620 may include one or more of a propulsion system 624, an electrical system 626, a hydraulic system 628, and an environmental system 630. Any number of other systems may be included.

The disclosed systems and methods for detecting impacts to vehicle surfaces may be employed during any one or more of the stages of the aircraft manufacturing and service method 600. As one example, the disclosed systems and methods for detecting impacts to vehicle surfaces may be employed during material procurement 606. As another example, components or subassemblies corresponding to component/subassembly manufacturing 608, system integration 610, and or maintenance and service 616 may be fabricated or manufactured using the systems and methods for detecting impacts to vehicle surfaces. Also, one or more examples, method examples, or a combination thereof may be utilized during component/subassembly manufacturing 608 and/or system integration 610, for example, by substantially expediting assembly of or reducing the cost of an aircraft 602. Similarly, one or more of system examples, method examples, or a combination thereof may be utilized while the aircraft 602 is in service, for example and without limitation, to maintenance and service 616.

The systems and methods for detecting impacts to vehicle surfaces are described in the context of an aircraft; however, one of ordinary skill in the art will readily recognize that the disclosed systems and methods for detecting impacts to vehicle surfaces may be utilized for a variety of vehicles. For example, implementations of the embodiments described herein may be implemented in any type of vehicle including, e.g., helicopters, passenger ships, automobiles and the like.

Although various aspects of the disclosed systems and methods for detecting impacts to vehicle surfaces, and in particular aircraft and systems and methods for detecting impacts to aircraft surfaces have been shown and described, modifications may occur to those skilled in the art upon reading the specification. The present application includes such modifications and is limited only by the scope of the claims.

What is claimed is:

1. An aircraft, comprising:
an aircraft, including an aircraft body component comprising a first surface exposed to an exterior of the aircraft and a second surface opposite the first surface; and
a strain gauge affixed to the second surface of the aircraft body component.

2. The aircraft of claim 1 wherein the strain gauge includes a metal foil strain gauge, a metal wire strain gauge, a thin metal film strain gauge, a diffused metal strain gauge, or a semiconductor strain gauge, or a microelectromechanical system (MEMS) strain gauge.

3. The aircraft of claim 1 wherein the aircraft body component includes a forward-facing component of the aircraft.

4. The aircraft of claim 1 wherein the aircraft body component includes a component of at least one of an aircraft fuselage, wing, tail, landing gear, stabilizer, or engine.

5. The aircraft of claim 1 wherein the aircraft body component includes at least one of a nose, a leading-edge surface, and a nacelle of the aircraft.

6. The aircraft of claim 1 wherein the second surface is an interior surface.

7. The aircraft of claim 1 wherein the first surface is a forward-facing surface of the aircraft body component.

8. The aircraft of claim 1 comprising a plurality of strain gauges affixed to the second surface of the aircraft body component.

9. A system for detecting impacts to a surface of a vehicle, comprising:
a plurality of strain gauges coupled with a vehicle body component exposed to an exterior of the vehicle;
a measurement circuit connected to each of the plurality of strain gauges;
a data logger connected to the measurement circuit; and
a processor connected to the data logger and configured to flag for a potential impact condition when a measured electrical parameter of one or more of the plurality of strain gauges satisfies a potential impact indicator.

10. The system of claim 9 further comprising an output device connected to the processor.

11. The system of claim 9 further comprising a communication device connected to the processor.

12. The system of claim 9 wherein the vehicle is an aircraft, and wherein the vehicle body component is an aircraft body component.

13. A method for detecting impacts to a surface of a vehicle, comprising:
measuring an electrical parameter of a strain gauge as a function of time while the vehicle is in motion, wherein the strain gauge is coupled with a vehicle body component exposed to an exterior of the vehicle; and
flagging for a potential impact condition when the measured electrical parameter of the strain gauge satisfies a potential impact indicator.

14. The method of claim 13 wherein the vehicle is an aircraft, and wherein the vehicle body component is an aircraft body component.

15. The method of claim 14 further comprising communicating the flag for the potential impact condition to an output device in a flight deck of the aircraft.

16. The method of claim 14 further comprising communicating the flag for the potential impact condition via a data link to an off-board computer of an aircraft maintenance entity.

17. The method of claim 14 further comprising communicating the flag for the potential impact condition via a data link to an off-board computer of an airline dispatch entity.

18. The system of claim 12 wherein the aircraft body component includes a first surface exposed to an exterior of the aircraft and second surface opposite the first surface, and wherein the strain gauge is affixed to the second surface.

19. The system of claim 18 wherein the second surface is an interior surface.

20. The system of claim 18 wherein the first surface is a forward-facing surface of the aircraft body component.

* * * * *